United States Patent
Swope et al.

(10) Patent No.: US 6,801,159 B2
(45) Date of Patent: Oct. 5, 2004

(54) DEVICE FOR USE WITH A PORTABLE INERTIAL NAVIGATION SYSTEM ("PINS") AND METHOD FOR TRANSITIONING BETWEEN LOCATION TECHNOLOGIES

(75) Inventors: Charles B. Swope, Coral Springs, FL (US); Chet A. Lampert, Plantation, FL (US)

(73) Assignee: Motorola, Inc., Schaumburg, IL (US)

( * ) Notice: Subject to any disclaimer, the term of this patent is extended or adjusted under 35 U.S.C. 154(b) by 0 days.

(21) Appl. No.: 10/100,640

(22) Filed: Mar. 19, 2002

(65) Prior Publication Data

US 2003/0182053 A1 Sep. 25, 2003

(51) Int. Cl.[7] .............................. G01S 5/02; H04B 7/185
(52) U.S. Cl. .................. 342/357.14; 701/220; 701/217
(58) Field of Search ...................... 342/357.14; 701/220, 701/217; 367/134; 356/4.01, 237.1

(56) References Cited

U.S. PATENT DOCUMENTS 6,545,638 B2 * 4/2003 Sladen .................. 342/357.14

* cited by examiner

*Primary Examiner*—Theodore M. Blum
(74) *Attorney, Agent, or Firm*—Barbara R. Doutre; Terri S. Hughes

(57) ABSTRACT

A perimeter threshold of an area is defined. The location of a device (102) is tracked using a first location technology (108) when the device (102) precedes the perimeter threshold. The location of the device (102) is tracked using a second location technology (100) when the device (102) exceeds the perimeter threshold.

21 Claims, 3 Drawing Sheets

DEVICE FOR USE WITH A PORTABLE INERTIAL NAVIGATION SYSTEM ("PINS") AND METHOD FOR TRANSITIONING BETWEEN LOCATION TECHNOLOGIES

REFERENCE TO RELATED APPLICATIONS

The present application is related to the following U.S. applications commonly owned together with this application by Motorola, Inc.:

Ser. No. 10/101,132, filed Mar. 19, 2002, titled "Device For Use With A Portable Inertial Navigation System ("PINS") and Methods for Transitioning Between Location Technologies" by Lampert et al. (attorney docket no. CM03630J);

Ser. No. 10/078,796, filed Feb. 19, 2002, titled "Method Of Increasing Location Accuracy In An Inertial Navigational Device" by Swope et al. (attorney docket no. CM03612J); and Ser. No. 10/078,738, filed Feb. 19, 2002, titled "Device For Use With A Portable Inertial Navigation System (PINS) and Method For Processing PINS Signals" by Swope et al. (attorney docket no. CM03613J).

FIELD OF THE INVENTION

The present invention relates generally to a device for use with a portable inertial navigation system ("PINS") and methods for transitioning between location technologies.

BACKGROUND OF THE INVENTION

A traditional inertial navigation system ("INS") utilizes accelerometers, gyroscopes, and support electronics, such as a processor, in order to translate sensor data into motional changes. These changes are then translated to a position based on an initial referenced position and the integration or differentiation of the motion. As time progresses, the errors associated with the accelerometers and gyroscopes increase to a point where the translation to a position is outside of the required positional resolution, thus rendering the INS device ineffective or lost.

In one INS embodiment, the INS device is updated manually by resetting the INS device using a known fixed position or by returning back to the original reference position. The user manually resets the INS device and positional errors are cleared until the error occurs again requiring another reset.

In another embodiment, the INS device is updating an alternate location-finding device, such as a global positioning system ("GPS"). In this configuration, the attached GPS is providing data to a communication link sending back latitude and longitude information. The INS device is utilized when the GPS position is no longer available due to occulting of the satellites. The INS device is utilized to provide updates to the last known position and errors are accumulated at a rate of 2% to 5% of the distance traveled. The INS device is only used for updating the embedded GPS unit's location. Once a GPS signal is re-captured, the INS device is not used.

Traditionally, INS devices utilize output voltages representing the second derivative of a position to integrate and determine relative changes in motion. These are applied to the last known position update and a new one is generated with some small error. As time progresses, the errors are accumulated and the computed position is no longer usable by the INS user. A known location or position is required in order to correct for the errors. Traditional systems utilize GPS, or cycle through a fixed reference point to correct those errors.

Thus, there exists a need for a system that reduces error accumulation and performs stand-alone tracking in areas where GPS (or other similar location technologies) can no longer provide location updates to the user or infrastructure.

BRIEF DESCRIPTION OF THE FIGURES

A preferred embodiment of the invention is now described, by way of example only, with reference to the accompanying figures in which.

DETAILED DESCRIPTION OF THE PREFERRED EMBODIMENT

The present invention increases location accuracy in a portable inertial navigation system ("PINS"). PINS performs stand-alone tracking in areas where a radio frequency ("RF")-based location technology (e.g., global positioning system ("GPS"), RF triangulation, ultra wideband location, or the like) can no longer provide accurate location tracking updates to the user or infrastructure due to the occulting of the RF signals. Thus, the present invention maintains a high level of positional accuracy for users as they traverse through areas where traditional RF-based location technologies is not possible, such as an indoor structure, heavy foliage, urban canyons, etc.

Figure 1:
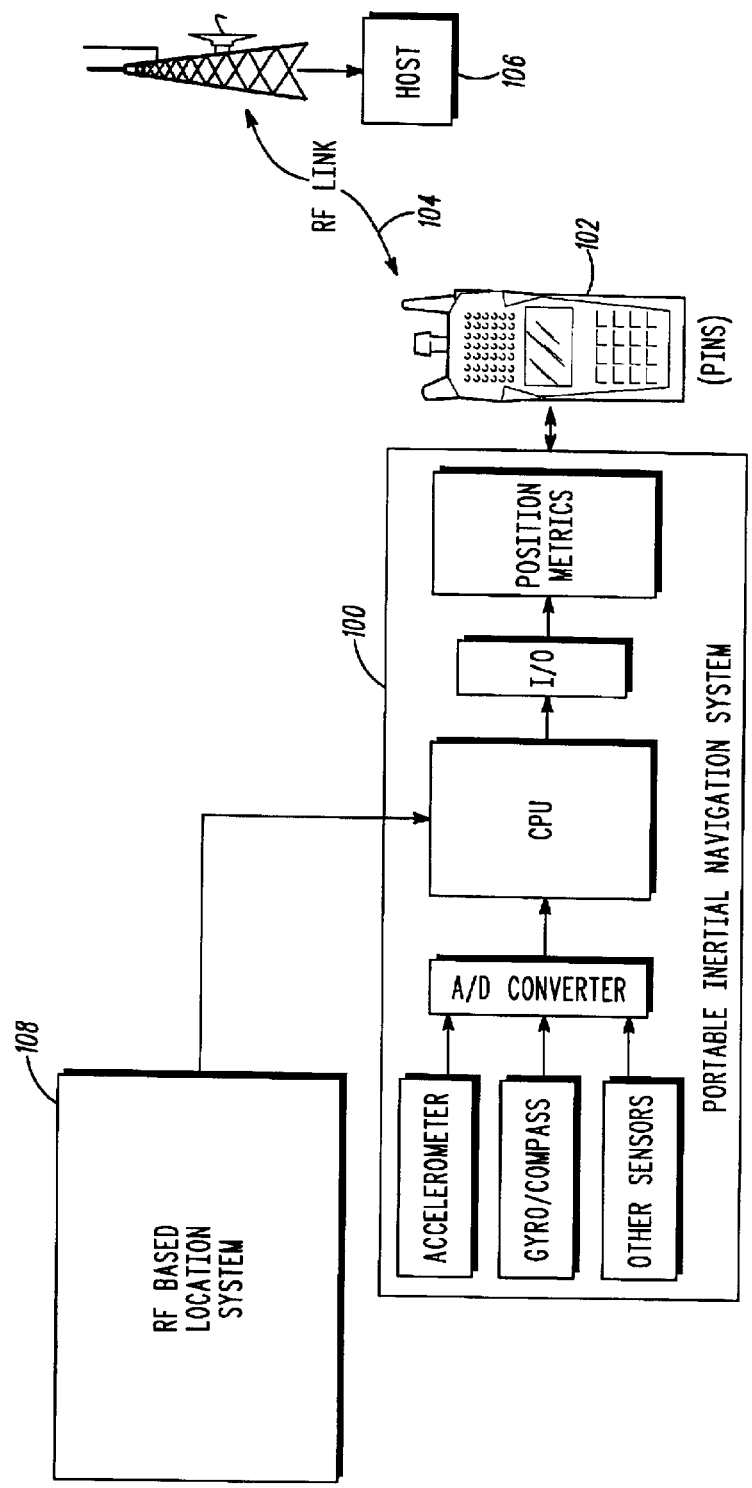
FIG. 1 illustrates a block diagram of the portable inertial navigation system ("PINS") architecture in accordance with the preferred embodiment of the present invention.

In accordance with the present invention, the PINS technology 100 is coupled with a traditional communication device, for example a two-way radio, ("PINS device") 102 to provide a link 104 to the host 106 as illustrated in FIG. 1. A user carries the PINS device 102 so that gestures (i.e., body movements) are translated into a position or a location. In order to accommodate this task, the following details the architectural designs for the two primary components in the PINS architecture: the PINS 100 and the host 106.

The PINS 100 consists of a host of sensors and required processing power to pre-process the raw data from the inertial sensors. There are several different sensors that can be used. Theses sensors include, but are not limited to, accelerometers, gyroscopes, compass, pressure, and temperature. The PINS 100 captures the motion of the user and translates it into positional changes through algorithmic processing. The processing can occur in the PINS 100, the host 106, a base computer (not shown), or any combination thereof. The PINS 100 is responsible for taking measurements of motion-related data (e.g., acceleration, rotation, direction), and translating this data into motion commands through sensor signal processing. The motion-related data is then transmitted to the host 106 that identifies the location of the PINS device/user 102 to those requiring resource tracking.

In the preferred embodiment, the PINS IMU, also referred to as an inertial measurement unit ("IMU"), receives an initialization function (e.g., GPS) to provide an initial position for the PINS 100 that allows it to utilize its relative metrics and convert them into an error correction (e.g., a location update). Although a GPS provides the initial location to the PINS 100 in the preferred embodiment, it is not necessary. Since the PINS 100 utilizes a communication infrastructure, a simple voice position update, or the like, will suffice as the initialization function.

The PINS 100 is responsible for gathering the necessary data to determine location. Measuring the several degrees of freedom of an object to arrive to the desired location information usually does this. An object has six degrees of freedom in space; three of them determine the position, while the other three determine the altitude of the object. The three linear axes determine the position: x, y, and z; the three rotational axes determine the altitude: theta (pitch), psi (yaw), and phi (roll).

The PINS 100 is responsible for measuring these variables that are necessary to track an object in three dimensions. These six axes are usually measured indirectly through their first or second moments. For example, theta, psi, and phi are derived through the measurement of their first moment or angular velocity rather than angular position; x, y, and z are usually measured through their second moment or linear acceleration rather than linear position. Thus, the PINS 100 relies on the motion of the object in order to determine its position.

The PINS 100 can be designed to output at least one type of data, such as sensor data, motion commands, position location, and/or the like. The radio channel 104 is responsible for sending the output data of the PINS 100 over-the-air to the host 106, typically residing at the base or dispatcher station. This communication is bi-directional, meaning that not only is data for the PINS 100 sent to the host 106, but the host 106 also must be able to send correction data/messages back to the PINS 100 for error correction(s).

In the preferred embodiment, the PINS 100 is remotely located from the host 106 and connected to the host 106 via an over-the-air radio channel 104; alternatively, the PINS 100 and the host 106 are co-located (e.g., both within the PINS device 102). Preferably, data is transmitted bi-directionally over the radio channel 104 between the PINS 100 and the host 106 residing at a base or dispatcher station. The host 106 is responsible for the collection, processing, and distribution of location data gathered from a variety of wireless networks. The data collected from the PINS 100 can be augmented with other location data, if available, such as RF triangulation, in order to get a better estimate of the actual location of the user. The estimated location may be further corrected by using a verification process. The verification process may involve correlating the motion history of the user against a dimensional rendering of a structure or building, or simply a dispatcher update using voice query information with the user. An example of the verification process that can be used in conjunction with the present invention is described in U.S. patent application Ser. No. 10/078,738, filed on Feb. 19, 2002, titled "Device for use with a Portable Inertial Navigation System (PINS) and Method for Processing PINS Signals" by Swope et al. (attorney docket no. CM03613J), commonly owned together with this application by Motorola, Inc., the disclosure of which prior application is hereby incorporated by reference, verbatim and with the same effect as though it were fully and completely set forth herein.

In accordance with the preferred embodiment of the present invention, a first method of transition between the two location technologies includes defining a perimeter threshold of an area by identifying a demarcation of when a device should rely on location data captured by a first location technology (e.g., a RF-based location solution such as GPS) and when the device should rely on location data captured by a second location technology (e.g., PINS). For purposes of the following examples only and for sake of simplicity, it is assumed that the host 106 relies on the location data captured by the first and second location technologies to track the location of the PINS device/user 102, however, any device/system can perform this task, including the PINS 100. Further, it will be appreciated by those skilled in the art that there are a variety of ways within the scope and spirit of the present invention to define the perimeter threshold. For example, the perimeter threshold may be defined by taking an active measurement of the desired area. Alternatively, the perimeter threshold may be defined by extrapolating the perimeter threshold from known data about the area; in the case of extrapolating the perimeter threshold, a first threshold metric is determined for the first location technology, and a second threshold metric is determined for the second location technology, wherein the first and second threshold metrics are based on the perimeter threshold.

Figure 2:
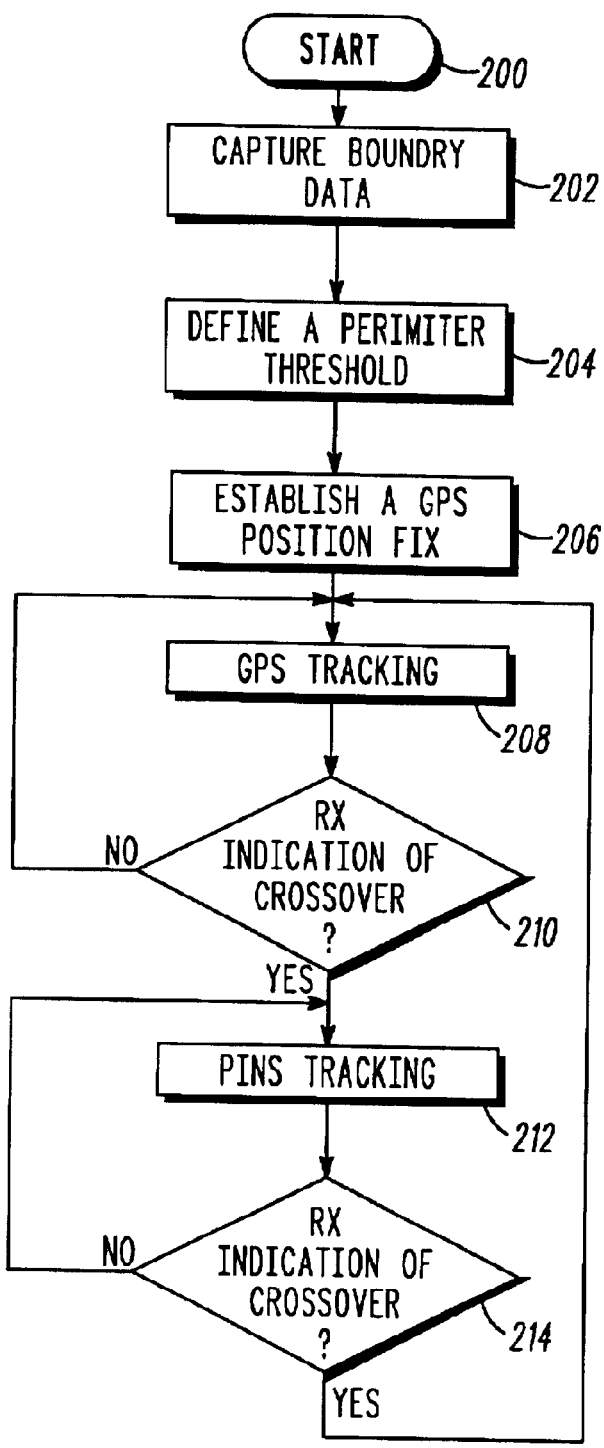
FIG. 2 illustrates a software state diagram for the host process in accordance with the preferred embodiment of the first method of transition in the present invention.

In an example operation of the first method 200, as illustrated in FIG. 2, the PINS 100 interfaces with the GPS receiver 108. The host 106 captures boundary data 202 and defines a perimeter threshold 204 around an area where the GPS position is no longer available due to occulting of the satellites. Typically, the host 106 establishes a GPS position fix 206. After the initial lock of the GPS receiver is achieved, the GPS receiver 108 continually monitors it's own internal measurements. The host 106 begins to use the calculated location data received from the GPS 108 to capture location data of the user when the GPS reports that it has a valid position fix 208. The host 106 monitors the location data received from the GPS 108, and if there are any indications that a crossover (i.e., the location of the PINS device/user 102 exceeds the perimeter threshold) is about to occur (e.g., heading, speed, etc.) 210, the host 106 begins a soft switch to the PINS 100 (i.e., start to exercise PINS electronics and prime the system) 212. Once the crossover occurs, the host 106 relies on location data captured by the PINS 100 as opposed to location data captured by the GPS. It should be noted that at least one of the first or second location technologies determines when the PINS device/user 102 precedes or exceeds the perimeter threshold; in the preferred embodiment, the location technology that is currently being used by the host to track the location of the PINS device/user 102 is the location technology that determines when the PINS device/user 102 precedes or exceeds the perimeter threshold. In the preferred embodiment, once the PINS device/user 102 crosses back over the perimeter threshold where the GPS 108 will provide accurate location information 214, the host 106 performs a soft switch back to GPS tracking 208. Thus, the present invention allows the host 106 to use the location data captured by the PINS 100 as soon as possible when the user 102 enters a structure or other area where the GPS satellite signals are obstructed. As a result, the present invention removes the latency of the GPS reporting that it has lost a valid position fix. Removing the latency is necessary in order to have a more precise starting position for the PINS device 100.

Let's now turn the discussion to a second method of transition between the two location technologies. The second method involves using one or more metrics associated with the RF-based location solution 108 in order to determine a more accurate transition to using the PINS location technology 100 in order to minimize or eliminate the RF-based location solution latency in determining that it has lost a position fix. In the preferred embodiment of the second method, a GPS is used as the RF-based location solution 108 when the RF signals are not occulted. GPS metrics are used in conjunction with the overall tracking status given by the RF-based location solution 108. An example of the overall tracking status used in GPS 108 is relayed as either having a valid position lock or not having a valid position lock. This status is available as part of the standard GPS tracking information in the National Marine Electronics Association ("NMEA") recommended minimum specific GPS/Transit data ("RMC) message. Additional metrics for GPS 108 could include dilution of precision ("DOP") and signal quality measurements. Since many GPSs 108 now have open source code, the DOP and signal strength metrics are available to those skilled in the art. Utilizing additional GPS metrics along with the overall tracking status refines the transition from one location technology to another as described in the present invention, resulting in a much less initial error in location tracking using PINS 100.

Figure 3:
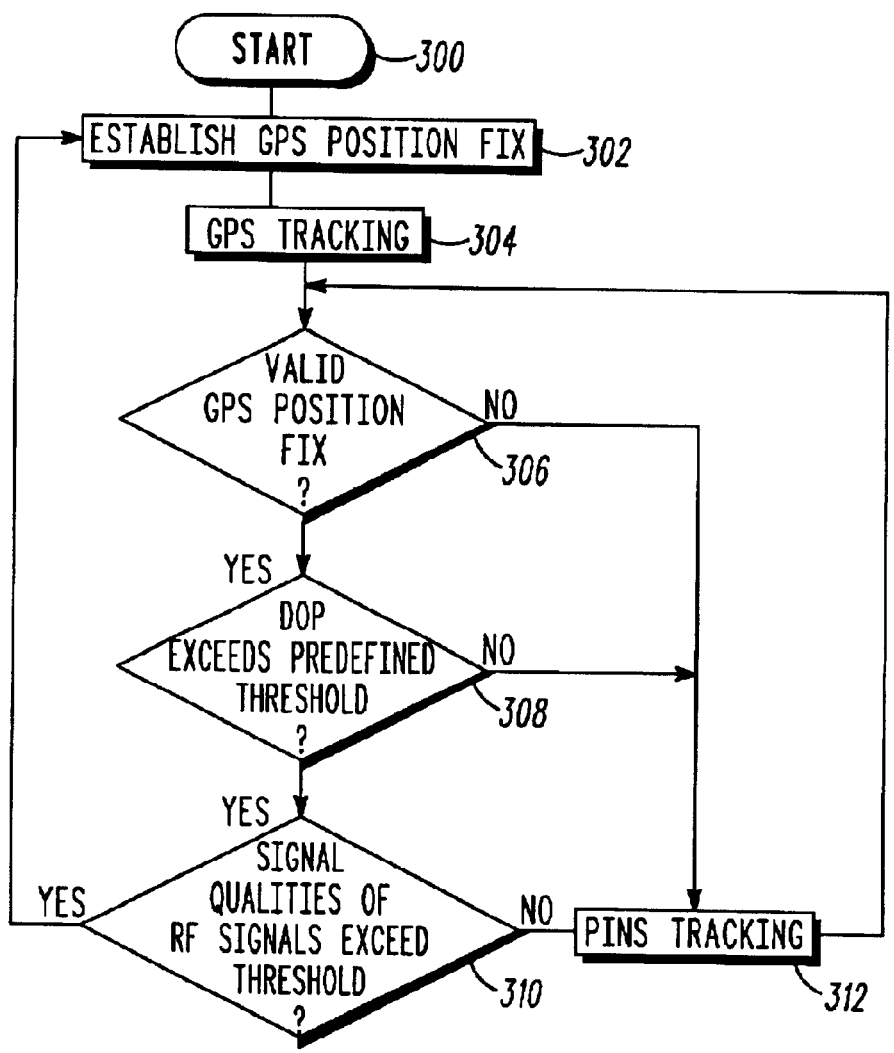
FIG. 3 illustrates a software state diagram for the host process in accordance with the preferred embodiment of the second method of transition in the present invention.

In an example operation of the second method 300, as illustrated in FIG. 3, the PINS 100 interfaces with a GPS receiver 108. Typically, the host 106 establishes a GPS position fix 302, and after the initial lock of the GPS receiver is achieved, the host 106 begins to use the calculated location data received from the GPS 108 to capture location data of the user 102; it should be noted that any suitable device/system, including the PINS 100 and the PINS device 102, can capture/track the location of the user 102. The host 106 monitors at least one metric of the plurality of RF signals used in the GPS 108 and established a predetermined threshold for that metric. In the preferred embodiment of the second method, the host 106 monitors the overall tracking status, the DOP metric, and the signal quality metric for the plurality of RF signals uses with the GPS 108; it should be noted, however, that any subset of the metrics listed, any additional metric, or any combination thereof can be monitored and still remain within the spirit and scope of the present invention. Thus, returning to the present example, when the GPS 108 reports that it has a valid position fix as well as having sufficient DOP and signal quality metrics 304, the host 106 tracks the location of the PINS device/user 102 using the GPS 108 (i.e., the first location technology). If, however, the host 106 identifies that a metric of an individual RF signal in the plurality of RF signals has fallen below a predetermined threshold required for acceptable location tracking accuracy (i.e., the GPS 108 reports that it has lost a valid position fix 306, or if the DOP falls below a pre-determined DOP threshold 308, or if the signal quality falls below a pre-determined signal-quality threshold 310), the host 106 performs an immediate transition to the PINS location technology 312 using the last-known completely-qualified location coordinates provided by the GPS 108 as the initial reference for the PINS 100. Once the location coordinates are known, the host 106 establishes a valid position of the PINS device/user 102 using the PINS 100 (i.e., the second location technology) and begins to use the calculated location data received from the PINS 100 to capture location data of the user 102.

It should be noted that, in the preferred embodiment, the GPS receiver 108 continually monitors it's own internal measurements regardless if the host 106 is tracking the location of the PINS device/user 102 with the GPS 108 or PINS 100. As such, if there is any indication that the GPS metrics that are monitored by the host 106 are about to met and/or exceed its respective predetermined threshold, the host 106 performs a soft transition back to the RF-based location solution. In other words, when the GPS 108 reports that it has a valid position lock 306, the DOP is above the DOP threshold 308, and the signal quality is above the signal-quality threshold 310, an immediate switch back to GPS tracking is performed 304. It is also important to note that, in the preferred embodiment, if any one of monitored metrics fell below their respective threshold, a transition from tracking the PINS device/user 102 using the GPS 108 to tracking the PINS device/user 102 using the PINS 100 will occur; however, all of the monitored metrics must meet/exceed their respective threshold in order to transition from the PINS 100 to the GPS 108. Thus, the second method 300 allows the host 106 to use the location data captured by the PINS 100 as soon as possible when the user 102 enters a structure or other area where the GPS satellite signals are obstructed. As a result, the second method 300 of the present invention also removes the latency of the GPS reporting that it has lost a valid position fix. Removing the latency is necessary in order to have a more precise starting position for the PINS 100.

While the invention has been described in conjunction with specific embodiments thereof, additional advantages and modifications will readily occur to those skilled in the art. The invention, in its broader aspects, is therefore not limited to the specific details, representative apparatus, and illustrative examples shown and described. Various alterations, modifications and variations will be apparent to those skilled in the art in light of the foregoing description. Thus, it should be understood that the invention is not limited by the foregoing description, but embraces all such alterations, modifications and variations in accordance with the spirit and scope of the appended claims.

What is claimed is:

1. A method for transitioning between location technologies comprising the steps of:
    defining a perimeter threshold of an area;
    tracking a location of a device using a first location technology when the device precedes the perimeter threshold; and
    tracking the location of the device using a second location technology when the device exceeds the perimeter threshold.

2. The method of claim 1 wherein at least both steps of tracking are performed by a host.

3. The method of claim 2 wherein the host is remotely located with respect to the device.

4. The method of claim 2 wherein the host is co-located with respect to the device.

5. The method of claim 1 wherein at least both steps of tracking are performed by the device.

6. The method of claim 1 wherein the first location technology determines when the device precedes the perimeter threshold.

7. The method of claim 1 wherein the first location technology determines when the device exceeds the perimeter threshold.

8. The method of claim 1 wherein the second location technology determines when the device precedes the perimeter threshold.

9. The method of claim 1 wherein the second location technology determines when the device exceeds the perimeter threshold.

10. The method of claim 1 wherein at least one of the first and second location technologies utilize an inertial navigation technology.

11. The method of claim 1 wherein at least one of the first and second location technologies utilize a RF-based location solution.

12. The method of claim 11 wherein the RF-based location solution is selected from a group consisting of: a global positioning system, RF triangulation, and ultra wideband location.

13. The method of claim 1 wherein the step of defining a perimeter threshold of an area comprises the step of taking an active measurement of the area.

14. The method of claim 1 wherein the step of defining a perimeter threshold of an area comprises the step of extrapolating the perimeter threshold from known data about the area.

15. The method of claim 14 further comprising the steps of:
  determining a first threshold metric for the first location technology; and
  determining a second threshold metric for the second location technology,
  wherein the first and second threshold are based on the perimeter threshold.

16. A first device used for transitioning between location technologies, which when operable, defines a perimeter threshold of an area, tracks a location of a second device using a first location technology when the second device precedes the perimeter threshold, and tracks the location of the second device using a second location technology when the second device exceeds the perimeter threshold.

17. The device of claim 16 wherein at least one of the first and second location technologies utilize an inertial navigation technology.

18. The method of claim 16 wherein at least one of the first and second location technologies utilize a RF-based location solution.

19. A device used for transitioning between location technologies, which when operable, defines a perimeter threshold of an area, tracks a location of the device using a first location technology when the device precedes the perimeter threshold, and tracks the location of the device using a second location technology when the device exceeds the perimeter threshold.

20. The device of claim 19 wherein at least one of the first and second location technologies utilize an inertial navigation technology.

21. The device of claim 19 wherein at least one of the first and second location technologies utilize a RF-based location solution.

* * * * *